United States Patent
Mueller et al.

(10) Patent No.: US 6,326,774 B1
(45) Date of Patent: Dec. 4, 2001

(54) STEP-UP DC VOLTAGE CONVERTER AND METHOD OF OPERATION

(75) Inventors: Eckart Mueller, Munich; Kevin Scoones, München; Erich-Johann Bayer, Thonhausen, all of (DE)

(73) Assignee: Texas Instruments Deutschland, GmbH, Freising (DE)

( * ) Notice: Subject to any disclaimer, the term of this patent is extended or adjusted under 35 U.S.C. 154(b) by 0 days.

(21) Appl. No.: 09/644,397

(22) Filed: Aug. 23, 2000

(30) Foreign Application Priority Data

Aug. 26, 1999 (DE) ................................................ 199 40 419

(51) Int. Cl.[7] ............................................................ G05F 1/10
(52) U.S. Cl. .......................................................... 323/222
(58) Field of Search ................................... 323/222, 224, 323/282, 285, 268, 284, 283; 363/97, 98, 127, 95

(56) References Cited

U.S. PATENT DOCUMENTS 4,347,474 * 8/1982 Brooks et al. ........................ 323/224
5,574,357 * 11/1996 Otake et al. .......................... 323/222

* cited by examiner

*Primary Examiner*—Rajnikant B. Patel
(74) *Attorney, Agent, or Firm*—Bret J. Petersen; Frederick J. Telecky, Jr.

(57) ABSTRACT

A step-up DC voltage converters circuit and method of operation which overcomes the problems associated with the prior art skip mode converters by reversing the flow of energy in the step-up DC voltage converter at the end of each switching cycle for a short constant time duration, thus making it possible to operate the step-up DC voltage converter over the full load current range at a fixed frequency which substantially facilitates filtering the output voltage. In addition to this the peak-to-peak output voltage ripple is less as compared to that of skip mode converters.

14 Claims, 2 Drawing Sheets

STEP-UP DC VOLTAGE CONVERTER AND METHOD OF OPERATION

The invention relates to methods of operating step-up DC voltage converters comprising a storage choke switched by switches so that an input DC voltage is converted into a stabilized output DC voltage. The invention relates furthermore to step-up DC voltage converters in which such methods are implemented.

BACKGROUND OF THE INVENTION

A step-up DC voltage converter is known whose basic circuit comprises a storage choke, the one terminal of which is connected to the input of the converter and the other terminal of which is connectable via a controllable switch to ground and is connected to the anode of a diode, the cathode of which is connected to the output of the converter. The circuit comprises in addition an output capacitor connected between the output of the converter and ground. One such basic circuit of a step-up DC voltage converter is described e.g. in the German textbook "Halbleiterschaltungstechnik" by U. Tietze and Ch. Schenk, 11th Edition, published by Springer-Verlag, Berlin, Heidelberg, 1999 on pages 985–986.

Such a converter requires in addition a clock, the clock signal of which dictates the switching cycle of the converter and a regulator circuit which regulates the output voltage of the converter to a predetermined setpoint value. Furthermore, a control circuit, e.g. a logic circuit needs to be provided which controls the switch with the aid of the clock signals of the clock and with the output signal of the regulator circuit.

In accordance with one known method, described e.g.in U.S. Pat. No. 5,481,178, the step-up DC voltage converter as described above may be operated as follows:

On commencement of each switching cycle the switch is set ON so that energy is stored in the storage choke, the current flowing through the storage choke increasing linearly. In this arrangement the regulator circuit monitors this current and sets the switch OFF when a specific current threshold which depends on the existing load situation is attained, resulting in the energy stored in the storage choke being output to the output of the converter in a second phase of the switching cycle. The choke current dropping linearly in this phase from its peak value attained at the end of the first phase flows through the diode into the output capacitor and a consumer connected to the output of the converter. In this arrangement the storage choke and its input voltage acts like a series connection of two voltage sources, this being the reason why the output voltage increases by the storage choke voltage relative to the input voltage.

The current threshold value is dictated by an error amplifier outputting a value proportional to the difference between a predetermined reference voltage and a voltage proportional to the actual output voltage of the converter, this value being compared in a comparator to a voltage value proportional to the current flowing through the storage choke. The output signal of the comparator controls the ON time of the switch.

The regulator circuit results, in all, in a pulse duration modulation of the ON time of the switch to achieve the desired setpoint output voltage of the converter. On commencement of the next switching cycle as dictated by the clock signals of the clock the switch is then returned ON and the method recommenced.

In this known method the step-up DC voltage converter is additionally operated as a function of the output load current in three different modes:

When the load current is high, the converter is operated in a first mode, the mode of continual storage choke current flow in which a permanent current flows through the storage choke (see FIG. 1a). In this arrangement the switch is cycled ON/OFF, whereby in the second phase of the switching cycle in which the switch is set OFF the storage choke current never drops to zero. The peak-to-peak output voltage ripple in this mode is very small.

With a reduction in the load current, the average current flowing through the storage choke must automatically also become less. At some point in time the average storage choke current then becomes so small that in the second phase of the switching cycle and prior to the end thereof it drops to zero (see also FIG. 1b). This is the second mode, the mode of interrupted storage choke current flow. The diode in this mode prevents a reverse current once the storage choke current has dropped to zero.

If the diode is replaced by a second switch which may be of advantage in certain applications, e.g. to reduce the energy losses occurring due to the diode, it needs to be signalled OFF following the drop in the storage choke current to zero, meaning it would need to be signalled ON again in the next switching cycle following OFF of the first switch.

In the two modes described a relatively high efficiency of the known step-up DC voltage converter is achievable. Since the converter is operated in these two modes at a defined known switching frequency, the frequency occurring in the voltage ripple is likewise known, thus making it a relatively easy task to filter out the noise appearing at the output. The ripple of the output voltage comprises in these modes no low-frequency components which is a salient requirement for the use of such converters in telecommunication devices, e.g. in mobile telephones.

So that the regulation function is still available in the mode of interrupted storage choke current flow the controllable switch needs to be ON at least for a certain minimum time duration, i.e. as long as the comparators of the regulator circuit and the logic circuit of the control circuit have sufficient time to settle at specific levels. When the load current requirement in the interrupted storage choke current current flow mode is very low it may be that the ON time of the switch required as a minimum for settling is too high. Then, in the first switching phase of the switching cycle, during which the controllable switch is set ON, more energy would be stored in the choke than is needed at the time for achieving the load current. In this case the converter would no longer be able to regulate the output voltage, i.e. the output voltage would violate its defined setpoint value.

To get round this problem and to achieve good efficiency of the converter even when the load current is very small or non-existent, the converter as known from U.S. Pat. No. 5,481,178 is operated in a third mode, a so-called skip mode. To adapt the energy stored in the storage choke to a very low or non-existent load current requirement in the skip mode individual switching cycles in which no energy is stored in the choke are skipped and thus also no energy can be passed on to the converter output (see FIG. 1c). The controllable switch is thus set ON e.g. only for every 2, 3 or only every 10 switching cycles. The number of switching cycles skipped depends on the level of the load current needed at the time, whereby a comparator may be provided which monitors the output voltage and signals the converter ON as soon as a critical comparison value is no longer attained and OFF as soon as this comparison value is exceeded.

However, the skip mode has numerous disadvantages especially in the case of step-up DC voltage converters when intended for use in telecommunication devices. Thus, in the skip mode the step-up DC voltage converter is activated with an irregular frequency and the ripple of the output voltage comprises low-frequency components which makes noise filtering difficult. As compared to the two other modes the ripple of the output voltage in the skip mode is also stronger, the reason for this being that the output voltage is regulated only by a simple bang-bang circuit. In conclusion, an additional circuit arrangement is needed to shuttle the step-up DC voltage converter between the interrupted storage choke current current mode and the skip mode.

SUMMARY OF THE INVENTION

It is thus the object of the present invention to provide methods of operating step-up DC voltage converters and to provide step-up DC voltage converters in which the problems as described above encountered in step-up DC voltage converters operated in the skip mode at low load currents are obviated whilst simultaneously achieving a good efficiency of the converter so that they are suitable more particularly for use in telecommunication devices.

This object is achieved by a first method in accordance with the invention for operating a step-up DC voltage converter including a storage choke, the one terminal of which is connected to the input of the converter and the other terminal of which is connectable via a first controllable switch to ground and via a second controllable switch to the output of the converter; a clock outputting a first clock signal dictating the switching cycle of the converter, and a second clock signal, the cycle of which corresponds to that of the first clock signal; and a regulator circuit which regulates the voltage at the output of the converter to a setpoint value, which during each switching cycle comprises the steps:

initially setting the first switch ON and the second switch OFF;

then setting the first switch OFF and the second switch ON once the current through the storage choke has attained a value as dictated by the regulator circuit; and setting the second switch OFF should the storage choke current have substantially dropped to zero before the end of the switching cycle, the second switch being reset ON at the end of the switching cycle for a constant time duration dictated by the second clock signal and which is short as compared to the length of the switching cycles, so that a transient flow of energy occurs from the output of the converter to the input of the converter.

The object in accordance with the invention is in addition achieved by a second mode for operating a step-up DC voltage converter including a storage choke, the one terminal of which is connected to the input of the converter and the other terminal of which is connectable via a first controllable switch to ground and via a second controllable switch to the output of the converter, a diode connected in parallel to the second switch, the anode of which is connected to the input of the converter; a clock outputting a first clock signal dictating the switching cycle of the converter, and a second clock signal, the cycle of which corresponds to that of the first clock signal; and a regulator circuit which regulates the voltage at the output of the converter to a setpoint value, which during each switching cycle comprises the steps:

initially setting the first switch ON and the second switch OFF;

then setting the first switch OFF when the current through the storage choke has attained a value as dictated by the regulator circuit; and setting the second switch ON at the end of the switching cycle for a constant time duration dictated by the second clock signal and which is short as compared to the length of the switching cycles, so that a transient flow of energy occurs from the output of the converter to the input of the converter.

In conclusion the object in accordance with the invention is achieved by step-up DC voltage converters with which the first method in accordance with the invention and the second method in accordance with the invention may be implemented and which read from the claims 6 and 8 respectively.

The easiest way of getting round the disadvantages of the skip mode would be to simply include a small dummy load. However, this would reduce the efficiency of the converter due to the ohmic losses occurring in the dummy load. The invention takes the more elegant approach in overcoming the problems associated with the skip mode by it reversing the flow of energy in the step-up DC voltage converter at the end of each switching cycle for a short constant time duration, thus making it possible to operate the step-up DC voltage converter over the full load current range at a fixed frequency which substantially facilitates filtering the output voltage. In addition to this the peak-to-peak output voltage ripple is less as compared to that of skip mode converters.

BRIEF DESCRIPTION OF THE DRAWINGS

Further features and advantages of the invention read from the following description of preferred embodiments of the invention which will now be detained with reference to the drawings in which.

DESCRIPTION OF THE PREFERRED EMBODIMENTS

Figure 1A:
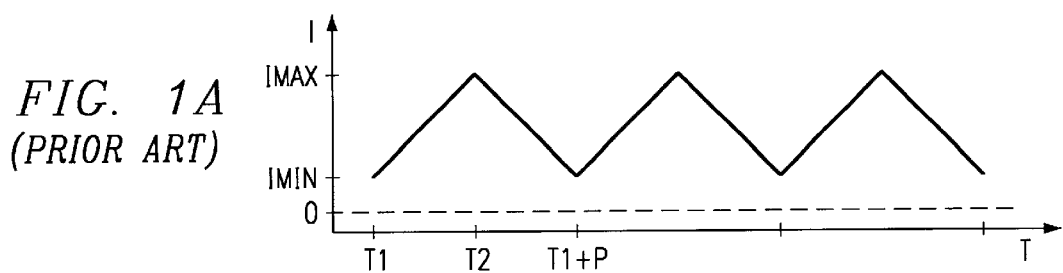
FIGS. 1a–c are three graphs plotting the profile of the storage choke current as a function of time for different loads of the converter relative to a prior art method of operating a step-up DC voltage converter involving three operating modes.
Figure 1B:
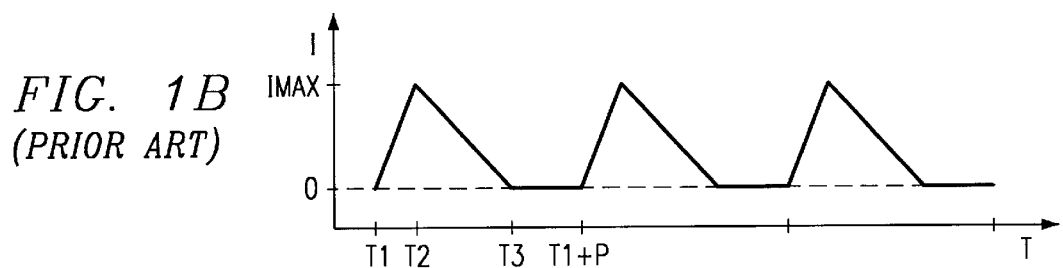
Figure 1C:
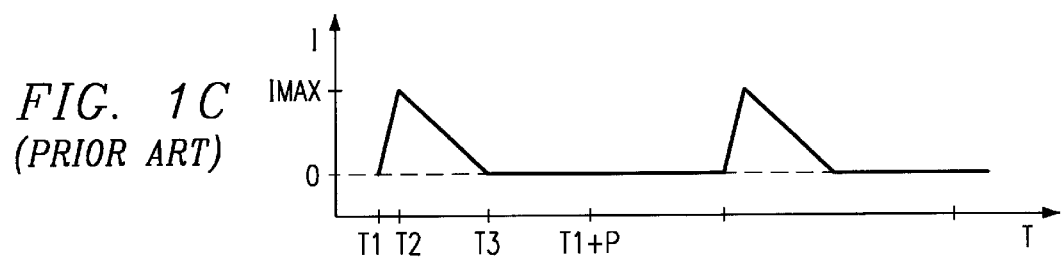

Referring now to FIG. 1 there are illustrated three graphs illustrating the three operating modes of a known step-up DC voltage converter operated as detailled in the background description, whereby I denotes the storage choke current.

Figure 2:
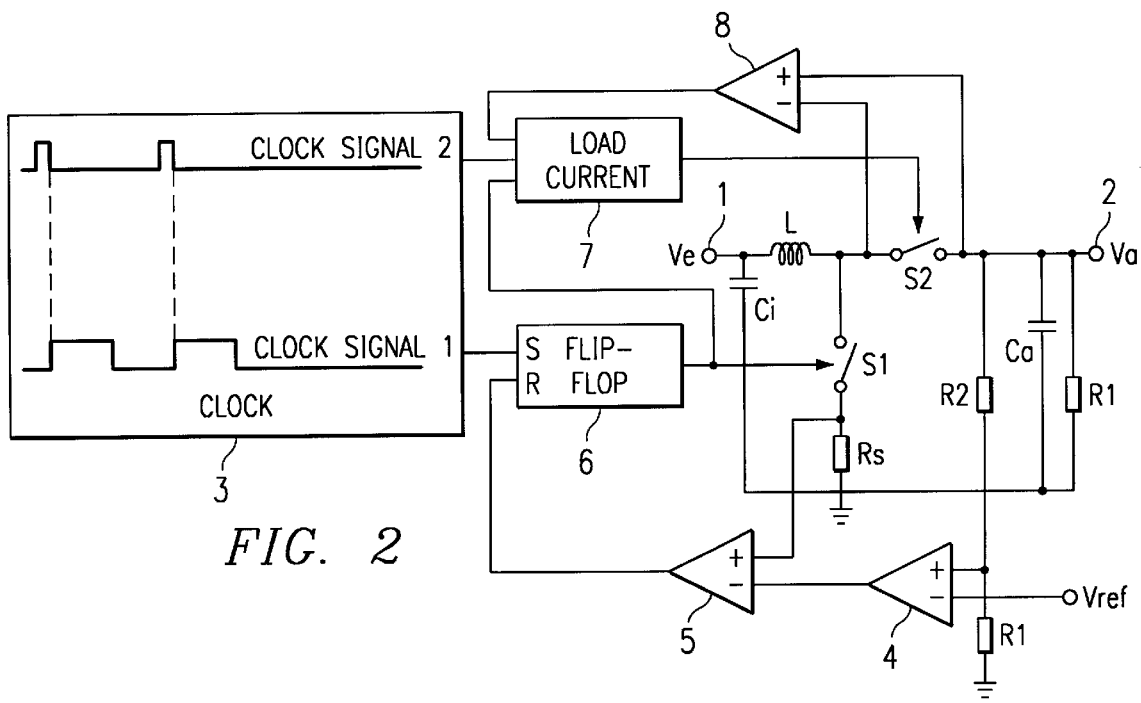
FIG. 2. is a circuit diagram of one preferred embodiment of a first step-up DC voltage converter in accordance with the invention.

Referring now to FIG. 2 showing the circuit diagram of one preferred embodiment of a first step-up DC voltage converter in accordance with the invention, the configuration of the basic control circuit of this converter will first be detailed.

It contains a storage choke L, the one terminal of which is connected to the input 1 of the converter, to which a constant DC voltage Ve is applied, as furnished e.g. by a battery. The other terminal of the storage choke L is connectable via a first controllable switch S1 to ground and via a second controllable switch S2 to the output 2 of the converter to which the output voltage Va generated by the converter is applied which is at a higher potential than that of the input voltage Ve. The switches may be MOSFETs, for instance. Connected between the input 1 of the converter and ground is an input capacitor Ci and between the output 2 of the converter and ground an output capacitor Ca. The basic circuit of the converter comprises in conclusion the resistor RI connected between the converter output I and ground symbolizing a load to be supplied by the converter.

In addition to the basic circuit the step-up DC voltage converter as shown in FIG. 2 comprises a clock, a regulator circuit, a control circuit and a circuit for sensing the direction of the current, all of which will now be described in the following:

The clock 3 generates a first clock signal defining the switching cycle of the converter, and a second clock signal having the same cycle as the first clock signal but staggered in time relative thereto and having a pulse duration which is short as compared to the clock period. The timing of the second clock signal as compared to that of the first clock signal is indicated in the box symbolizing the clock in FIG. 2.

The regulator circuit, whose task it is to regulate the output voltage Va of the converter to a predetermined setpoint value, comprises firstly an error amplifier 4 receiving at one input a voltage derived from the voltage divider R1, R2 and proportional to the actual output voltage Va of the converter and amplifying and outputting the difference thereof into a reference voltage Vref applied to its other input. In addition, the regulator circuit comprises a comparator 5 receiving at one input the output signal of the error amplifier and at its other input a signal corresponding to the voltage across the sensing resistor Rs, this signal being proportional to the level of the current flowing through the storage choke. One such regulator circuit is known from prior art and reads e.g. from the above-mentioned U.S. Pat. No. 5,481,178.

The control circuit of the step-up DC voltage converter as shown in FIG. 2 consists of a flip-flop 6 and a logic circuit 7. The flip-flop 6 receives at its reset input R the output signal of the comparator 5 of the regulator circuit and at its set input S the first clock signal of the clock 3. The output signal of the flip-flop 6 controls the first switch S1. The logic circuit 7 receives the output signal of the flip-flop 6, the second clock signal of the clock 3 and the output signal of a circuit sensing the current direction as described below. The output signal of the logic circuit 7 controls the second controllable switch S2.

The circuit sensing the current direction consists of a comparator 8, the one input of which is connected to the terminal of the second switch S2 and the other input of which is connected to the the other terminal of the second switch S2. The output signal of the comparator signals whether the energy is flowing from the input 1 of the converter to output 2 of the converter or vice-versa.

The method of operating the step-up DC voltage converter as shown in FIG. 2 will now be explained with reference to FIGS. 3a and b plotting the profile of the storage choke current I as a function of time in the two operating modes of the converter.

Figure 3A:
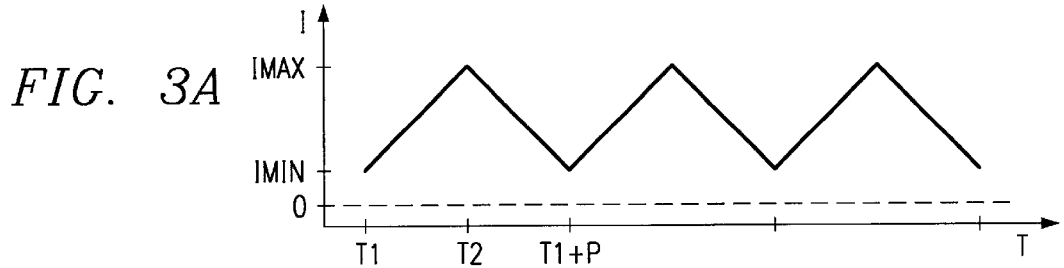
FIGS. 3a–b are two graphs plotting the profile of the storage choke current as a function of time for different loads of the converter relative to the methods in accordance with the invention of operating a step-up DC voltage converter involving the two operating modes.

When the load current is high the converter is operated like the known converter in the continual storage choke current flow mode as shown in FIG. 3a. Since this mode is known it will be described only briefly in the following. On commencement of a switching cycle, at the point in time t1, flip-flop 6 is first set by the edge of the first clock signal, the output signal of this flip-flop then setting the first controllable switch S1 ON. The output signal of the flip-flop is also applied to the logic circuit which then outputs an output signal which sets the second controllable switch S2 OFF. As evident from FIG. 3a the storage choke current initially increases linearly until the comparator 5 of the regulator circuit outputs a control signal indicating that the energy stored in the storage choke L is sufficient to achieve the desired output voltage Va at the output load R1 of the converter existing at the time. This is the point in time t2 as evident from FIG. 3a at which the maximum current Imax is attained. Here, the flip-flop 6 is reset by the control signal of the comparator 5 so that the switch S1 is set OFF. The output signal of the flip-flop 6 likewise attains the logic circuit 7 which then outputs an output signal which signals the switch S2 ON. The energy stored in the storage choke L is then output to the output capacitor Ca and the load R1, the current flowing through the storage choke dropping between the point in time t2 and the point in time t1+p linearly to a minimum value Imin, where p denotes the period of the switching cycle. On commencement of a new switching cycle the procedure is repeated. In the continual storage choke current flow mode the current passing through the storage choke L never drops below zero.

Figure 3B:
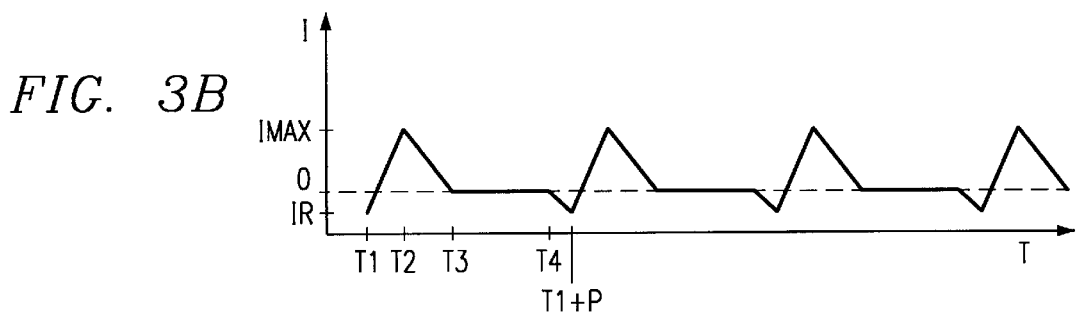

When the load current is low the step-up DC voltage converter in accordance with the invention as shown in FIG. 2a operates in the interrupted storage choke current flow mode as shown in FIG. 3b with a reverse current which replaces the interrupted storage choke current current flow mode as usual with existing converters and the skip mode (see in this respect FIGS. 1b and c).

The interrupted storage choke current flow mode as shown in FIG. 3b with reverse current initially works like the continual storage choke current flow mode (see points in time t1, t2 in FIG. 3b corresponding to those as shown in FIG. 3a). Changes first occur at the point in time t3 at which the storage choke current flowing in the energy transfer phase, which is now reduced due to the low average output current of the converter, attains the value zero before the end of the switching cycle (t1+p). Since the output voltage Ca of the converter is now higher than the voltage furnished from the input end, the circuit for sensing the current direction first assures that no reverse current is able to flow to the input of the converter 1. As soon as the comparator 8 of the circuit for sensing the current direction "sees" the inverse potential conditions it outputs a control signal to the logic circuit 7 when then sets the controllable switch S2 OFF, no storage choke current then flowing between the points in time t3 and t4 as shown in FIG. 3b.

Shortly before the end of the switching cycle at the point in time t4 as shown in FIG. 3b the second controllable switch S2 is then resignalled ON, the first controllable switch remaining OFF. This is done by the pulse of the second clock signal which attains via the logic circuit 7 the control input of the second controllable switch S2. The second switch is thereby set ON in each switching cycle during a precisely defined constant, and as compared to the duration of a switching cycle, short time duration "t4−t1+p" at the end of the switching cycle. This may be achieved e.g. by the pulse duration of the second clock signal corresponding to the length of the short constant time duration, it thereby being shifted in time by this pulse duration against the first clock signal. Now a current flowing from the output 2 of the converter to the input 1 of the converter briefly flows through the storage choke L (reverse current). On commencement of the next switching cycle (point in time t1+p) flip-flop 6 is again set by the main clock signal, resulting in the switch S1 being set ON and switch S2 being set OFF. As a result of this the current flowing through the storage choke is again reduced, it passing through zero before then again increasing to its maximum value Imax as dictated by the regulator circuit.

Part of the energy briefly flowing from the output of the converter to the input of the converter is thereby stored in the input capacitor Ci. When a rechargeable battery is used as the source of the input voltage, then part of this energy may also be stored in consequence.

In the interrupted storage choke current flow mode with reverse current the first switch S1 is activated by the regulator circuit in the same way as in the modes described at the outset as employed in prior art (continual storage choke current flow mode, interrupted storage choke current flow mode), the regulator circuit likewise operating in the same way as in conventional step-up DC voltage converters.

The salient difference as compared to existing converters is that the flow of energy through the choke now occurs bidirectionally. In the case of a disappearing load current requirement the energy of the current flowing in the opposite direction appearing between the repeat ON of the second switch S2 (point in time t4) and the point in time of the repeat flow of current through zero after the end of the switching cycle corresponds to the energy (of the forward current) then flowing from the converter input into the converter output on an average. With a disappearing load current requirement the time integral over the current above the zero line (forward current) as shown in FIG. 3b corresponds to the time integral over the current below the zero line (FIG. 3b illustrating the case in which a very low load current requirement still exists, this being the reason why the integral over the current above the zero line is larger than the integral over the current below the zero line). This current makes no contribution to the load current and is shuttled between converter input and output. The regulator circuit is able to settle—even though the load current requirement is very low or non-existent—and equilibrium is attained for the value of the ON time of the first switch S1. Since no load current appears, there is no practical reduction in the efficiency of the converter.

This method in accordance with the invention eliminates the skip mode as used hitherto along with all of its disadvantages. As evident from FIG. 3b the circuit now operates with a constant switching frequency even when the load current is very low or non-existent. Low-frequency components no longer exist in the ripple of the output voltage thus greatly facilitating noise filtering. The method in accordance with the invention is thus particularly suitable for use in step-up DC voltage converters as employed in telecommunication devices, e.g. mobile telephones. In addition, however, a lower peak-to-peak output voltage ripple materializes than in existing converters using the skip mode.

Figure 4:
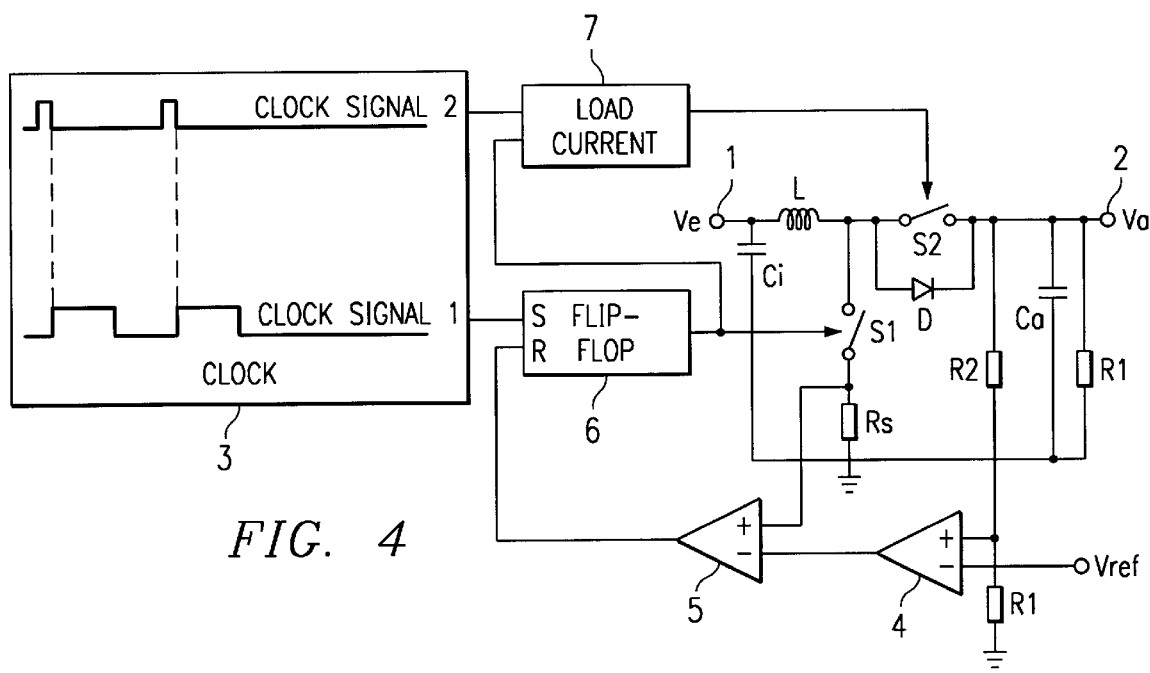
FIG. 4 is a circuit diagram of one preferred embodiment of a second step-up DC voltage converter in accordance with the invention.

Referring now to FIG. 4 there is illustrated the circuit diagram of one preferred embodiment of a second step-up DC voltage converter in accordance with the invention. This converter differs from the converter as shown in FIG. 2 merely by the circuit for sensing the current direction, i.e. the comparator 8 being replaced by a diode D connected in parallel to the controllable switch S2. Like the converter as shown in FIG. 2 the converter as shown in FIG. 4 is operated with the two operating modes as shown in FIG. 3. In this arrangement the method is reduced by the diode D to the following three steps as implemented in each switching cycle;

1. setting the first switch ON and the second switch OFF on commencement of the switching cycle;

2. setting the first switch OFF when the current through the storage choke L has attained a value as dictated by the regulator circuit; and 3. setting the second switch ON at the end of the switching cycle during a time duration "t4−t1+p" as defined by the second clock signal.

In conclusion it is to be noted that in the converters as shown in FIGS. 2 and 4 setting the second controllable switch S2 by the second clock signal during a time duration "t4−t1+p" of each switching cycle may be done permanently, i.e. irrespective of whether the converter is in the continual storage choke current flow mode or interrupted storage choke current flow mode with reverse current, since in the continual storage choke current flow mode the switch S2 in the converter as shown in FIG. 2 is ON in any case between "t4−t1+p", whereas in the converter as shown in FIG. 4 only one further parallel current path to the diode D is opened due to the ON of the switch S2 in the continual storage choke current flow mode.

What is claimed is:

1. A method for operating a step-up DC voltage converter including a storage choke, the one terminal of which is connected to the input of the converter and the other terminal of which is connectable via a first controllable switch to ground and via a second controllable switch to the output of the converter; a diode connected in parallel to the second switch, the anode of which is connected to the input of the converter; a clock outputting a first clock signal dictating the switching cycle of the converter, and a second clock signal, the cycle of which corresponds to that of the first clock signal; and a regulator circuit which regulates the voltage at the output of the converter to a setpoint value, which during each switching cycle comprises the steps:

initially setting the first switch ON and the second switch OFF;

then setting the first switch OFF when the current through the storage choke has attained a value as dictated by the regulator circuit; and setting the second switch ON at the end of the switching cycle for a constant time duration dictated by the second clock signal and which is short as compared to the length of the switching cycles, so that a transient flow of energy occurs from the output of the converter to the input of the converter.

2. The method as set forth in claim 1 wherein the pulse duration of said second clock signal corresponds to the length of said short constant time duration, it thereby being shifted in time by this pulse duration against said first clock signal.

3. The method as set forth in claim 1 wherein part of the energy briefly flowing during said short constant time duration is stored in an input capacitor connected between the input of said converter and ground.

4. The method as set forth in claim 1 wherein part of the energy briefly flowing during said short constant time duration is stored in a rechargeable battery furnishing the input voltage of said converter.

5. A step-up DC voltage converter comprising a storage choke, the one terminal of which is connected to the input of the converter and the other terminal of which is connectable via a first controllable switch to ground and via a second controllable switch to the output of the converter;

a clock outputting a first clock signal dictating the switching cycle of the converter, and a second clock signal, the cycle of which corresponds to that of said first clock signal; and a regulator circuit which regulates the voltage at the output of the converter to a setpoint value; and a control circuit which during each switching cycle initially sets the first switch ON and the second switch OFF;

then sets the first switch OFF and the second switch ON when the current through the storage choke has attained a value as dictated by the regulator circuit; and sets the second switch OFF should the storage choke current have substantially dropped to zero before the end of the switching cycle, the second switch being reset ON at the end of the switching cycle for a constant time duration dictated by the second clock signal and which is short as compared to the length of the switching cycles, so that a transient flow of energy occurs from the output of the converter to the input of the converter.

6. The step-up DC voltage converter in claim 5 wherein said control circuit comprises a flip-flop receiving at its set input said first clock signal and at its reset input the output signal of said regulator circuit and the output signal of which controls said first switch, and a logic circuit receiving the output signal of said flip-flop, the second clock signal and the output signal of a comparator monitoring the direction of the current through said second switch, the output signal of said logic circuit controlling said second controllable switch.

7. The step-up DC voltage converter in claim 6 wherein the pulse duration of said second clock signal corresponds to the length of said short constant time duration, it thereby being shifted in time by this pulse duration against said first clock signal.

8. The step-up DC voltage converter of claim 7 further comprising an input capacitor connected between the input of said converter and ground and in which the energy flowing during said short constant time duration is storable.

9. The step-up DC voltage converter of claim 8 wherein the input voltage of which is furnished by a rechargeable battery in which the energy flowing during said short constant time duration is storable.

10. A step-up DC voltage converter comprising a storage choke, the one terminal of which is connected to the input of the converter and the other terminal of which is connectable via a first controllable switch to ground and via a second controllable switch to the output of the converter and a diode connected in parallel to said second switch, the anode of said diode being connected to the input of said converter;

a clock outputting a first clock signal dictating the switching cycle of the converter, and a second clock signal, the cycle of which corresponds to that of the first clock signal;

a regulator circuit which regulates the voltage at the output of the converter to a setpoint value a control circuit which during each switching cycle initially sets the first switch ON and the second switch OFF;

then sets the first switch OFF when the current through the storage choke has attained a value as dictated by the regulator circuit; and sets the second switch ON at the end of the switching cycle for a constant time duration dictated by the second clock signal and which is short as compared to the length of the switching cycles, so that a transient flow of energy occurs from the output of the converter to the input of the converter.

11. The step-up DC voltage converter in claim 10 wherein said control circuit comprises a flip-flop receiving at its set input said first clock signal and at its reset input the output signal of said regulator circuit and the output signal of which controls said first switch, and a logic circuit receiving the output signal of said flip-flop, and the second clock signal, the output signal of said logic circuit controlling said second switch.

12. The step-up DC voltage converter in claim 11 wherein the pulse duration of said second clock signal corresponds to the length of said short constant time duration, it thereby being shifted in time by this pulse duration against said first clock signal.

13. The step-up DC voltage converter of claim 12 further comprising an input capacitor connected between the input of said converter and ground and in which the energy flowing during said short constant time duration is storable.

14. The step-up DC voltage converter of claim 13 wherein the input voltage of which is furnished by a rechargeable battery in which the energy flowing during said short constant time duration is storable.

* * * * *